(12) United States Patent
Wise et al.

(10) Patent No.: US 9,656,593 B2
(45) Date of Patent: May 23, 2017

(54) FLIGHT VEHICLE AUTOPILOT

(71) Applicant: The Boeing Company, Chicago, IL (US)

(72) Inventors: Kevin A. Wise, St. Charles, MO (US); Eugene Lavretsky, Los Angeles, CA (US); Brian C. Roberts, St. Louis, MO (US); James H. Francis, Jr., Swansea, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/316,053

(22) Filed: Jun. 26, 2014

(65) Prior Publication Data

US 2016/0231753 A1    Aug. 11, 2016

(51) Int. Cl.

| B60Q 1/08 | (2006.01) |
|---|---|
| B60Q 1/14 | (2006.01) |
| G01C 21/10 | (2006.01) |
| G05D 1/08 | (2006.01) |
| B60Q 1/04 | (2006.01) |
| B60Q 1/06 | (2006.01) |

(52) U.S. Cl.
CPC .............. *B60Q 1/08* (2013.01); *B60Q 1/143* (2013.01); *G01C 21/10* (2013.01); *G05D 1/0808* (2013.01); *B60Q 2300/112* (2013.01); *B60Q 2300/332* (2013.01)

(58) Field of Classification Search
CPC ...................... F42B 10/64; F42B 15/01; G01C 19/44–19/54; G01C 21/16; G01C 21/18; G01C 21/20; G01P 15/00; G05D 1/0061; G05D 1/0066; G05D 1/044; G05D 1/0676; G05D 1/0684; G05D 1/0816; G05D 1/0825; G05D 1/107

See application file for complete search history.

(56) References Cited

U.S. PATENT DOCUMENTS

| 5,058,836 A | 10/1991 | Nobel |
| 5,762,290 A | 6/1998 | DuPont |
| 6,456,906 B1 * | 9/2002 | Hua ........................ G05D 1/107 |
| | | 102/501 |
| 8,190,305 B1 | 5/2012 | Prince |
| 2005/0040280 A1* | 2/2005 | Hua ........................ F42B 15/01 |
| | | 244/3.1 |

(Continued)

FOREIGN PATENT DOCUMENTS

| EP | 1 117 972 | 7/2001 |
| EP | 1 196 831 | 4/2002 |

OTHER PUBLICATIONS

Extended European Search Report from EP Application No. 15174006.5 dated Jun. 29, 2016, 9 pages.

*Primary Examiner* — Dale Moyer
(74) *Attorney, Agent, or Firm* — Miller, Matthias & Hull LLP

(57) ABSTRACT

An autopilot for a flight vehicle is described herein. Various configurations of the autopilot may be used in a gyro-less guidance and control system, which can be designed based on translational acceleration measurements only. In other configurations, the one or more components of the autopilot may be used as a backup to primary components of a guidance and control system. The autopilot may use state estimates to determine effector commands to control a flight vehicle.

28 Claims, 8 Drawing Sheets

(56) References Cited

U.S. PATENT DOCUMENTS

| | | | |
|---|---|---|---|
| 2009/0143925 A1* | 6/2009 | Lavretsky | G05D 1/0825 |
| | | | 701/3 |
| 2010/0198514 A1* | 8/2010 | Miralles | F41G 7/008 |
| | | | 701/302 |
| 2010/0332052 A1 | 12/2010 | Ratliff | |
| 2012/0043410 A1* | 2/2012 | Geswender | F42B 15/01 |
| | | | 244/3.2 |
| 2013/0146718 A1* | 6/2013 | Tao | B64C 3/44 |
| | | | 244/90 R |
| 2015/0060593 A1* | 3/2015 | Prince | B64C 5/12 |
| | | | 244/3.21 |

\* cited by examiner

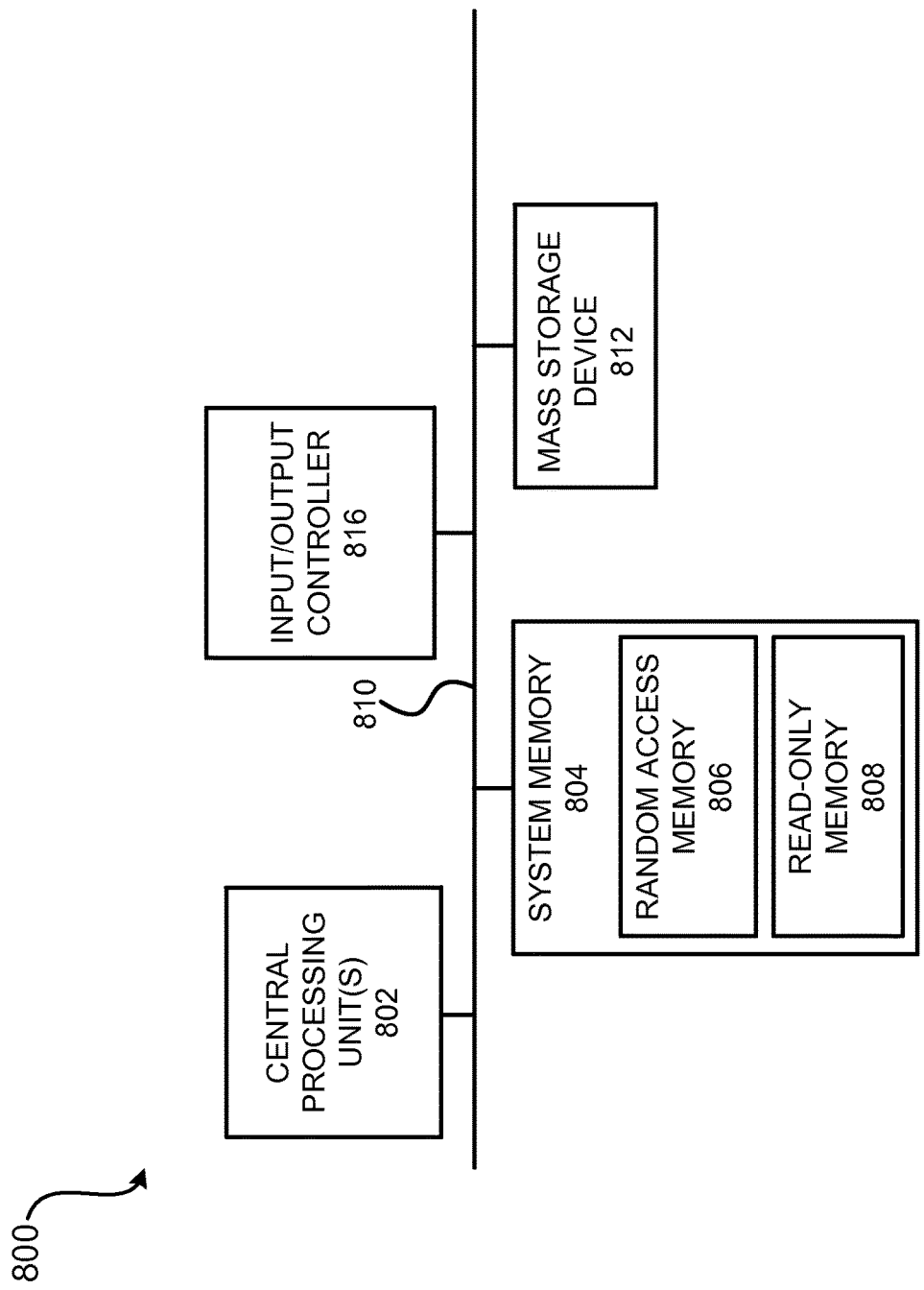

FLIGHT VEHICLE AUTOPILOT

BACKGROUND

Conventional autopilots can use both angular rates as measured by gyroscopes and translational accelerations from inertial measurement units ("IMU"s) to control the flight of air vehicles. Gun-launched (both conventional and electromagnetic) projectiles experience very large gravitational forces ("g-forces") at launch. These g-forces can destroy or damage gyroscopes used to stabilize an unstable airframe. In some instances, the hardening ("g-hardening") of these and other types of sensors against the large g-forces experienced during launch, as well as other possible operations, can be difficult and expensive.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a computer-implemented method for controlling a flight vehicle is disclosed. In some implementations, the method includes receiving a guidance command, receiving a movement measurement, and generating a plurality of state estimates. The method further includes utilizing the guidance command and the plurality of state estimates to output a control surface command. The method also includes determining an effector command from the control surface command, and outputting the effector command to at least one control effector to control the flight vehicle according to the effector command.

According to another embodiment disclosed herein, a guidance and control system for a flight vehicle is disclosed. In some implementations, the guidance and control system includes a guidance system operative to generate a guidance command, a movement measurement device operative to measure a movement of the flight vehicle to generate a movement measurement, and an autopilot module operative to receive the guidance command. The autopilot module may also be operative to generate a plurality of state estimates, and utilize the guidance command, the movement measurement, and the plurality of state estimates to output a control surface command. The guidance and control system may further include a control logic module operative to receive the control surface command and in response, generate an effector command, and a control effector operative to receive the effector command to control the flight vehicle according to the effector command.

According to yet another embodiment disclosed herein, a control module for a flight vehicle is disclosed. According to some implementations, the control module may include an autopilot module and a control logic module. The autopilot module may be configured to receive a guidance command from a guidance system and an output of a movement measurement device. The autopilot module may be operative to increase the gain of the guidance command to a gained guidance command. The autopilot module may include an error module, a state estimator, and a gain module.

The error module may be operative to receive as inputs the guidance command and the output of the movement measurement device, and may be further operative to output an error. The state estimator may be operative to receive a difference between the gained guidance command and the error and calculate one or more state estimates. The gain module may be operative to receive the one or more state estimates to calculate a control surface command. The control logic module may be operative receive the control surface command and output an effector command.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein:

FIG. 8 illustrates a computer in which a guidance and control system using a state estimator may be implemented according to at least one embodiment disclosed herein.

Figure 1:
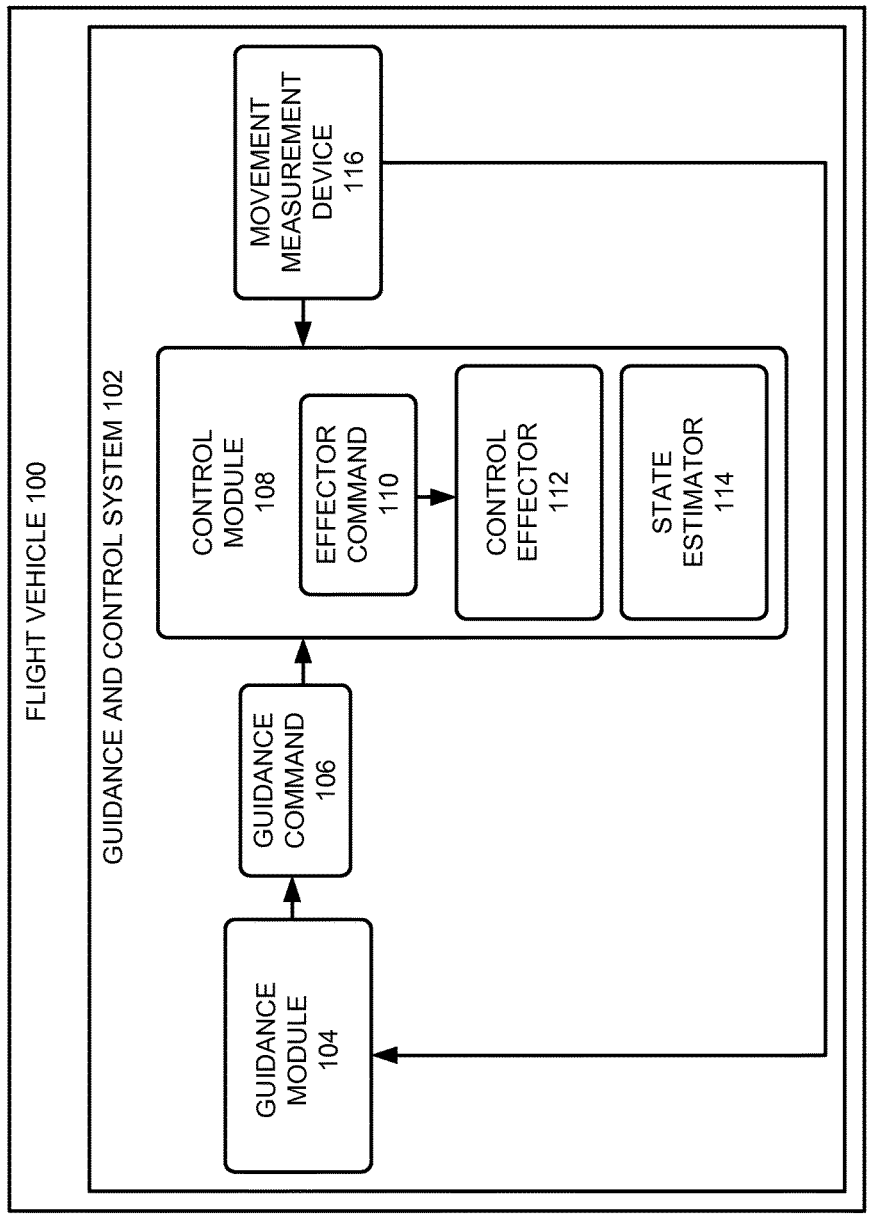
FIG. 1 is a diagram of a flight vehicle that utilizes state estimates for a guidance and control system according to at least one embodiment disclosed herein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed to technologies for an autopilot system in a projectile, guided munitions, a missile, or aircraft, referred to herein as a flight vehicle. The flight vehicle may be, but is not limited to, a hypervelocity projectile, a mortar, an artillery shell, a skid-to-turn weapon, a bank-to-turn weapon, or any object guided through a medium, particularly at high velocity. This disclosure is not limited to any particular type of flight vehicle. Rather, the technologies described herein may be advantageous in any flight vehicle, including those subjected to substantial g-forces that may damage conventional gyroscopes. In some implementations, the technologies described herein may also be used as a backup system to maintain stable flight when gyroscope measurements fail and only translational accelerations are available for control calculations.

According to one configuration, a guidance and control system of a flight vehicle uses a state estimator to determine an estimate of the state of the flight vehicle. A control module of the guidance and control system uses the state estimates to execute guidance commands received from a guidance module of the guidance and control system. The guidance and control system may use movement measurement devices to measure acceleration. The movement measurement devices may include, but are not limited to, vertical acceleration, lateral acceleration, bank angle, or thrust. In some configurations in which the flight vehicle does not include an onboard thrust component, such as a bullet or artillery shell, the configuration may not include a thrust measurement device.

Based on the measured accelerations, the state of the flight vehicle may be estimated. These estimates may be used as an input during the execution of a guidance command from the guidance module or on subsequent guidance commands from the guidance module. As used herein, a "state" is an operational characteristic of the flight vehicle, including, but not limited to, position, direction, change of direction, rate dynamics, and control effector states.

The control module may include an autopilot module and a control logic module. According to various embodiments described in detail below, the autopilot module may receive a guidance command from the guidance module. Though not limited to any specific guidance command, in some examples, the guidance command may be associated with a target location, flight trajectory, flight route, or waypoint to which the flight vehicle is to navigate.

The autopilot module utilizes the estimate of the state of the flight vehicle to calculate a control surface command that is used to control the flight vehicle according to a guidance command. The control surface command may be commands for an elevator, aileron, rudder, or other conventional control surface operation. The autopilot module issues the control command to the control logic module.

The control surface command determines an appropriate control surface to which the control command is to be issued. In some configurations, the flight vehicle may be controlled using one or more control effectors. The control effectors may take the form of traditional control surfaces such as an elevator, aileron, or rudder. In some configurations, a control effector may include, or may be used in lieu of, the traditional control surfaces described above. In these implementations, a control effector may be a moveable surface of the flight vehicle that, either alone or in conjunction with other control effectors, changes the aerodynamics of the flight vehicle. The change of aerodynamics can maneuver the flight vehicle. Control effectors may be used in some instances in which the flight vehicle is not designed to, or intended to, maintain a rotational orientation about a central axis like a traditional airplane. The control effector may be manipulated by one or more actuators.

When used, the control effector, either alone or in conjunction with other control effectors, can mimic the aerodynamic effect of conventional elevator, aileron, and/or rudder control surfaces. The control surface command, which may include outputs for an elevator, aileron, rudder, or other conventional control surfaces may be translated into an effector command that is used to modify one or more control effectors of the flight vehicle in order to modify the current state of vehicle in a manner that will achieve the desired navigational goals received from the guidance module.

References are made to the accompanying drawings that form a part hereof, and which are shown by way of illustration, specific embodiments, or examples. Like numerals represent like elements through the several figures.

Turning now to FIG. 1, FIG. 1 is a partial diagram of a flight vehicle 100 that utilizes state estimates for a guidance and control ("G&C") system 102, which may be used according to at least one embodiment disclosed herein. The G&C system 102 may be used to control the flight of stable or unstable aircraft or projectiles, such as the flight vehicle 100. The G&C system 102 may be configured provide one or more outputs to cause one or more flight path trajectory changes to the flight vehicle 100.

The G&C system 102 includes a guidance module 104. The guidance module 104 may be configured to issue a guidance command 106. In one implementation, the guidance command 106 may be preprogrammed instructions stored in an onboard storage device of the flight vehicle 100. The pre-programmed instructions may be configured to instruct the G&C system 102 to guide the flight vehicle 100 according to a specified flight route or to a specified destination or waypoint.

In another implementation, the guidance module 104 may receive instructions from a transmission source while the flight vehicle 100 is in flight. A transmission source may include, but is not limited to, a ground station, an aircraft, satellite, or spacecraft. The guidance module 104 may output the guidance command 106 based on the instructions received from the transmission source. In other configurations, a combination of stored, pre-programmed instructions and instructions received by a transmission from a transmission source may be used.

The guidance module 104 issues the guidance command 106 to a control module 108. The control module 108 receives the guidance command 106 and determines an effector command 110. The effector command 110 is a command issued to a control effector 112 (or more than one control effector 112). As noted above, the control effector 112 may take the form of traditional control surfaces such as an elevator, aileron, or rudder, or may be one or more surfaces of the flight vehicle 100 that can be used to control the flight vehicle 100 by altering the aerodynamic characteristics of the flight vehicle 100.

In some instances, to determine the effector command 110 (or the guidance command 106), a state of the flight vehicle 100 may need to be determined. As mentioned above, a state is an operational characteristic of the flight vehicle, including, but not limited to, position, direction, change of direction, rate dynamics, and control effector states. Thus, the control module 108 may use a state estimator 114. The state estimator 114 receives various inputs to estimate one or more states associated with the flight vehicle 100. The estimated state may then be used by the control module 108 to determine the effector command 110.

State estimates may be needed in some implementations because equipment designed to measure the actual state of the flight vehicle 100 may not be feasible or may be unavailable. A commonly used state measurement device is a gyroscope. A gyroscope may be used to measure the angular rates and orientation angles (a state) of a flight vehicle about various axes. In some instances, though, the use of state measurement equipment like gyroscopes may be unfeasible.

Some conventional gyroscopes are prone to error or destruction in high g-force situations (such as the launch of a high velocity projectile). In some of these instances, even if attempts are made to harden the gyroscope against the forces of acceleration experienced during launch (or other high g-force maneuvers), there may be a tendency for the gyroscope to fail or to output erroneous measurements. In other instances, even in low g-force maneuvers, a gyroscope may fail or otherwise become inoperable. In these and other situations, rather than measuring an actual state of the flight vehicle 100, a state estimate may be provided by the state estimator 114.

To determine the state estimate, the state estimator 114 may receive an input from a movement measurement device 116. Although not limited to any particular movement, the movement measurement device 116 may be an instrument designed to measure acceleration in a direction or a bank angle. Typical accelerations may include, but are not limited to, linear acceleration (thrust induced), lateral acceleration or vertical acceleration. The bank angle (a rotational orientation of the vehicle around its long axis) may be the angle at which the flight vehicle 100 is inclined about its longitudinal axis with respect to the plane of its curved path.

Although not limited to a piloted aircraft, for purposes of description, accelerations are described in a manner that would be associated with a piloted aircraft. For example, a lateral acceleration may be considered an acceleration caused by a change in the yaw of the flight vehicle 100. In another example, the vertical acceleration may be considered an acceleration caused by a change in the pitch and the angle of attack of the flight vehicle 100. Some examples of the control module 108 are provided in FIGS. 2-4, below.

Figure 2:
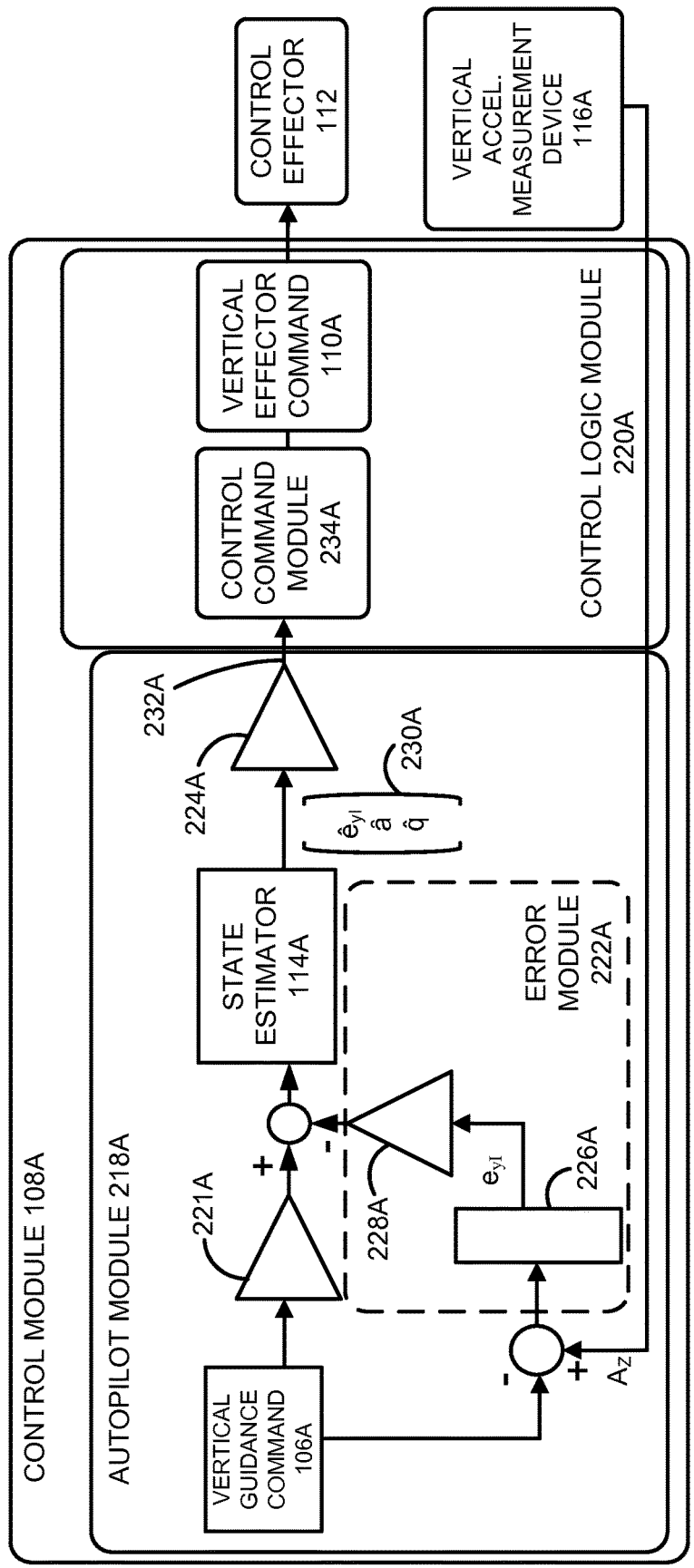
FIG. 2 is an illustration of a vertical control module according to at least one embodiment disclosed herein.

FIG. 2 is an illustration of a vertical control module 108A according to at least one embodiment disclosed herein. The vertical control module 108A may be configured to control the vertical attitude of the flight vehicle 100 by receiving a vertical acceleration guidance command 106A from the guidance module 104 (of FIG. 1). The vertical control module 108A includes an autopilot module 218A and a control logic module 220A. As will be explained in more detail, below, the autopilot module 218A uses estimates of the state of the flight vehicle 100 to determine one or more effector commands.

The autopilot module 218A includes a gain module 221A, an error module 222A, a state estimator 114A, and a gain module 224A. The gain module 221A receives the vertical acceleration guidance command 106A from the guidance module 104 (of FIG. 1). The vertical acceleration guidance command 106A represents a vertical acceleration requested by the guidance module 104. The gain module 221A increases the strength or value of the vertical acceleration guidance command 106A in order to compare the vertical acceleration guidance command 106A with an output of the error module 222A.

The error module 222A is configured to receive a vertical acceleration Az. The vertical acceleration Az is measured by a vertical acceleration measurement device 116A. The error module 222A computes an error, or difference, between the vertical acceleration Az and a desired vertical acceleration represented by the vertical acceleration guidance command 106A. The difference between the vertical acceleration guidance command 106A and the vertical acceleration Az is provided to an integrator 226A. The integrator 226A performs a calculation on the difference between the vertical acceleration guidance command 106A and the vertical acceleration Az and outputs an integrator output $e_{y,I}$. The integrator output $e_{y,I}$ is received as an input to an integrator gain module 228A.

The integrator gain module 228A increases the signal strength of the integrator output $e_{y,I}$ for subtraction from the output of the gain module 221A, which is a gained form of the vertical acceleration guidance command 106A. The subtraction of the integrator output $e_{y,I}$ from the gained vertical acceleration guidance command 106A modifies the gained vertical acceleration guidance command 106A. The modified and gained vertical acceleration guidance command 106A is provided as an input to the state estimator 114A.

The state estimator 114A is configured to perform a calculation on the modified and gained vertical acceleration guidance command 106A and produce one or more estimation outputs 230A. The estimation outputs 230A are estimates of some states of the flight vehicle. In the configuration illustrated in FIG. 2, the estimation outputs 230A include, but are not limited to, estimates of an error $\hat{e}_{y,I}$, an angle of attack $\hat{\alpha}$, and a pitch rate $\hat{q}$. As noted above, the estimation outputs 230A may be used in some implementations because equipment used to measure these quantities may not be useable at various performance levels.

For example, the pitch rate may be measured by one or more gyroscopes. In some implementations, gyroscopes may not be suitable for high g-force applications. In other examples, the instruments used to measure these quantities may become inoperative during flight. Thus, in a "backup" situation, as described above, various aspects of the vertical control module 108A may be used to estimate the quantities.

The estimation outputs 230A of the error $\hat{e}_{y,I}$, the angle of attack $\hat{\alpha}$, and the pitch rate $\hat{q}$ are received as an input to the gain module 224A. The gain module 224A combines the estimation outputs 230A of the error $\hat{e}_{y,I}$, the angle of attack $\hat{\alpha}$, and the pitch rate $\hat{q}$ and provides an elevator command 232A. The elevator command 232A is a control surface command. The elevator command 232A is used as the input to the control logic module 220A. The elevator command 232A may be termed a "control surface command."

As noted above, in some configurations, the movement of the flight vehicle 100 may not be caused by traditional or conventional control surfaces such as an elevator. In the example illustrated in FIG. 2, the elevator command 232A received from the autopilot module 218A is to be converted to a command suitable for an effector-type of control system. To convert the elevator command 232A received from the autopilot module 218A to a vertical effector command 110A, the control logic module 220A includes a control command module 234A.

The control command module 234A uses various algorithms to determine one or more control effectors 112 to implement a maneuver pursuant to the elevator command 232A. The control command module 234A may calculate that two or more control effectors are needed to perform the desired maneuver. The control command module 234A may also determine the amount or degree of change for each of the control effectors 112. For example, the position of one effector 112 may only be changed slightly, whereas the position of another effector 112 may be changed relatively greater. The control command module 234A outputs the vertical effector command 110A to the control effector 112 (or more than one effector 112).

Desirably, the control effector 112 causes a change in the position, direction, or other state of the flight vehicle 100. The vertical acceleration Az is measured by the vertical acceleration measurement device 116A. The vertical acceleration Az is provided as an input to the autopilot module 218A. The difference between the vertical acceleration guidance command 106A and the vertical acceleration Az is ultimately provided as an error. The error is used to modify the vertical acceleration guidance command 106A as issued by the guidance module 104 to calculate a new or updated elevator command 232A. In some configurations, the controllers may be used to implement one type of guidance command, such as the vertical acceleration guidance command as illustrated in FIG. 2, or may be used to implement a combination of guidance commands, such as the controller of FIG. 3.

Figure 3:
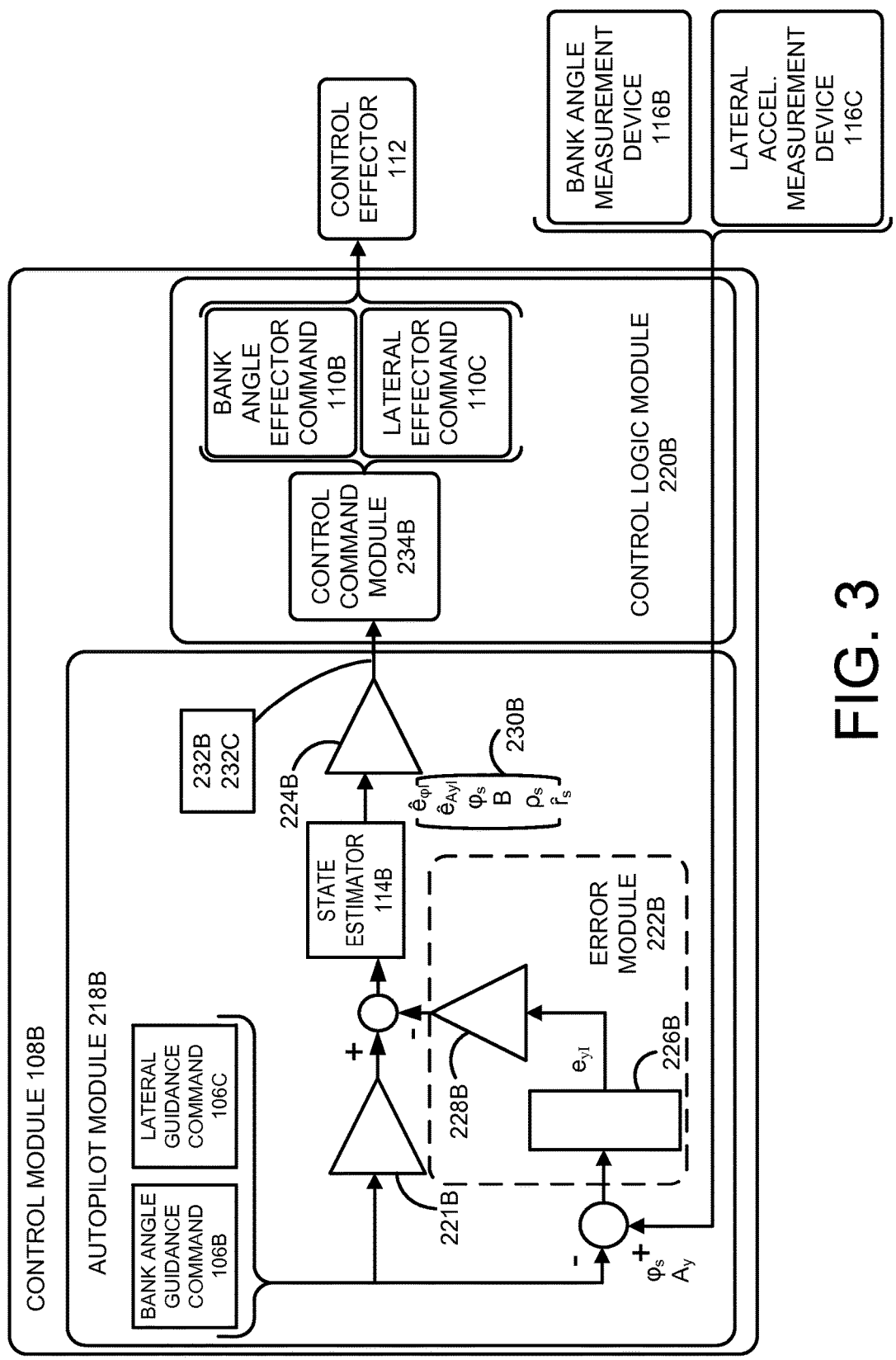
FIG. 3 is an illustration of a lateral/bank angle control module according to at least one embodiment disclosed herein.

FIG. 3 is an illustration of a lateral/bank angle control module 108B according to at least one embodiment disclosed herein. The lateral/bank angle control module 108B may be configured to control the lateral acceleration and/or the bank angle attitude of the flight vehicle 100. A bank angle guidance command 106B may be received from the guidance module 104 (of FIG. 1) to control the bank angle. In a similar manner, a lateral acceleration guidance command 106C may be received from the guidance module 104 to control the lateral acceleration. Both types of guidance commands 106 may be received and handled by the lateral/bank angle control module 108B. The lateral/bank angle control module 108B includes an autopilot module 218B and a control logic module 220B. As will be explained in more detail, below, the autopilot module 218B uses estimates of the state of the flight vehicle 100 to determine one or more effector commands.

The autopilot module 218B includes a gain module 221B, an error module 222B, a state estimator 114B, and a gain module 224B. The gain module 221B receives a bank angle guidance command 106B and/or a lateral acceleration guidance command 106C from the guidance module 104. The bank angle guidance command 106B represents a desired bank angle and the lateral acceleration guidance command 106C is a desired lateral acceleration. The gain module 221B increases the strength or value of the bank angle guidance command 106B and/or a lateral acceleration guidance command 106C from the guidance module 104 in order to compare the bank angle guidance command 106B and/or a lateral acceleration guidance command 106C with an output of the error module 222B.

The error module 222B is configured to receive bank angle $\phi_s$ as measured by a bank angle measurement device 116B and compute the difference (or error) between the bank angle guidance command 106B and the bank angle $\phi_s$ as measured by the bank angle measurement device 116B. In a similar manner, the error module 222B is configured to receive a lateral acceleration Ay as measured by a lateral acceleration measurement device 116C and compute the difference (or error) between the lateral acceleration guidance command 106C (the requested lateral acceleration) and the lateral acceleration Ay as measured by the lateral acceleration measurement device 116C.

The error module 222B provides as an input the difference between the bank angle guidance command 106B and the bank angle $\phi_s$ into an integrator 226B. The error module 222B may also provide as an input the difference between the lateral acceleration guidance command 106C and the acceleration Ay into the integrator 226B.

The integrator 226B calculates an integrator output $e_{yI}$. The integrator output $e_{yI}$ is received as an input to an integrator gain module 228B. The integrator gain module 228B increases the signal or strength of the integrator output $e_{yI}$ for subtraction from the bank angle guidance command 106B, which was gained at the gain module 221B and/or the lateral acceleration guidance command 106C, which may also be gained at the gain module 221B. The output of the comparison is received at the state estimator 114B.

The state estimator 114B is configured to perform a calculation on the output of the integrator gain module 228B and produce one or more estimation outputs 230B. In the configuration illustrated in FIG. 3, the estimation outputs 230B include, but are not limited to, estimates of a bank tracking error $\hat{e}_{\phi I}$, an integrated lateral acceleration $\hat{e}_{AyI}$, a yaw rate $\phi_s$, an angle of slideslip B, a roll rate $\rho_s$, and a bank angle $\hat{r}_s$. The estimation outputs 230B are estimates of some states of the flight vehicle.

The estimation outputs 230B of the bank tracking error $\hat{e}_{\phi I}$, an integrated lateral acceleration $\hat{e}_{AyI}$, a yaw rate $\phi_s$, an angle of slideslip B, a roll rate $\rho_s$, and a bank angle $\hat{r}_s$ are received as an input to the gain module 224B. The gain module 224B combines the estimates and provides an aileron command 232B and/or a rudder command 232C. The aileron command 232B and/or the rudder command 232C may be termed a "control surface command."

The aileron command 232B and/or the rudder command 232C are used as the inputs to the control logic module 220B. The control logic module 220B receives the aileron command 232B and/or the rudder command 232C and outputs a bank angle effector command 110B and/or a lateral effector command 110C. The control command module 234B uses various algorithms to determine one or more control effectors 112 to implement a maneuver pursuant to the aileron command 232B and/or the rudder command 232C. The control command module 234B may calculate that two or more control effectors are needed to perform the desired maneuver. The control command module 234B may also determine the amount or degree of change for each of the control effectors 112. For example, the position of one effector 112 may only be changed slightly, whereas the position of another effector 112 may be changed relatively greater. The control command module 234B outputs aileron command 232B and/or the rudder command 232C to the control effector 112 (or more than one effector 112).

Desirably, the control effector 112 causes a change in the position, direction, or other state of the flight vehicle 100. The bank angle $\phi_s$ is measured by the bank angle measurement device 116B. The lateral acceleration Ay is measured by the lateral acceleration measurement device 116C. The difference between the bank angle guidance command 106B and/or the lateral acceleration guidance command 106C and the bank angle $\phi_s$ or the lateral acceleration Ay is ultimately provided as an error. The error may be used to modify bank angle guidance command 106B and/or the lateral acceleration guidance command 106C as issued by the guidance module 104 to generate a new or updated bank angle guidance command 106B and/or the lateral acceleration guidance command 106C.

Figure 4:
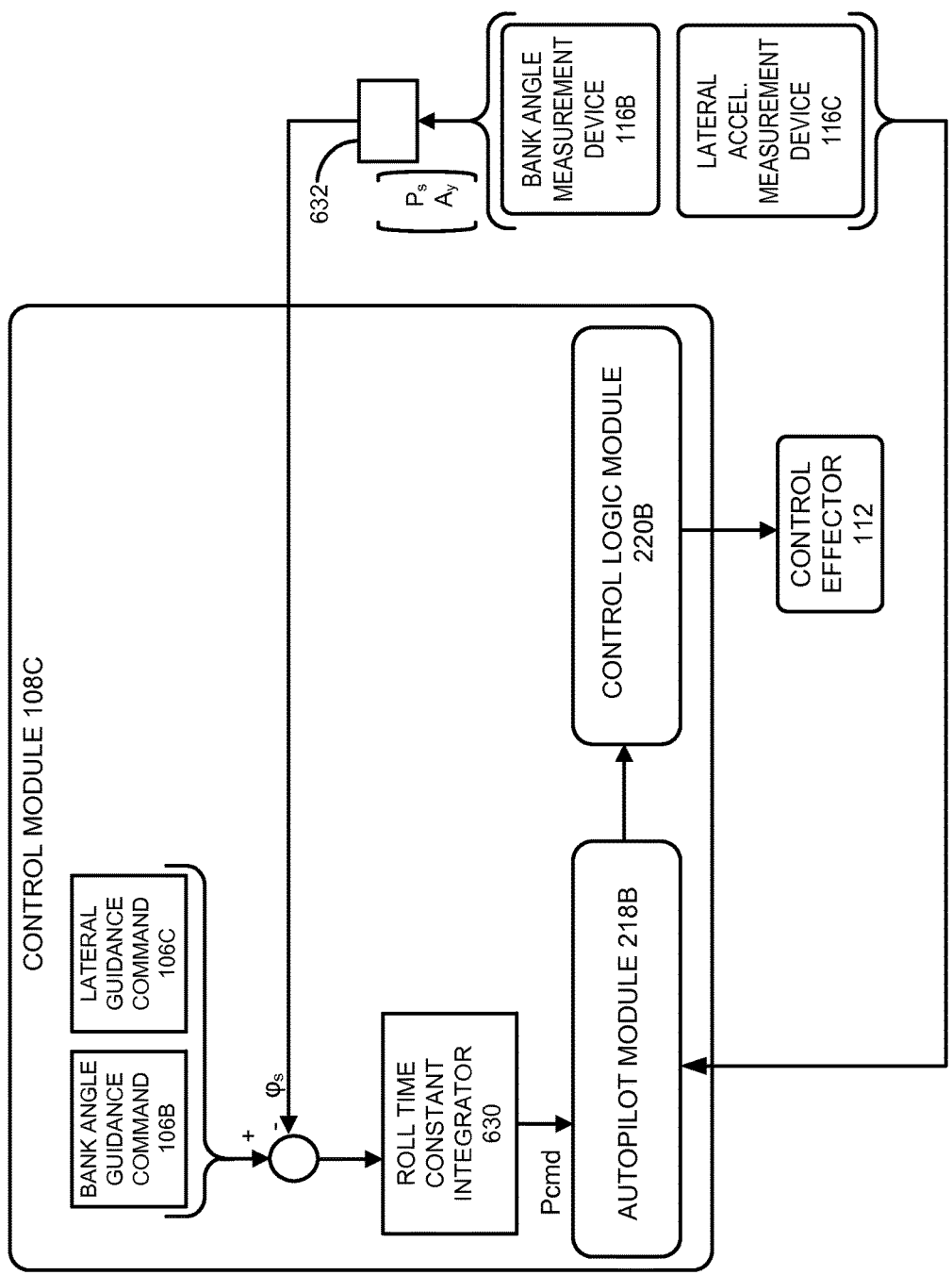
FIG. 4 is an illustration of an alternative lateral/bank angle control module according to at least one embodiment disclosed herein.

FIG. 4 is an illustration of an alternative lateral/bank angle control module 108C according to at least one embodiment disclosed herein. The lateral/bank angle control module 108C uses a roll time constant as an additional input. A roll time constant is the time required for a flight vehicle to attain final rolling velocity after step aileron inputs. The roll time constant may be used to alleviate or correct various performance issues of the flight vehicle. For example, the flight vehicle 100 may experience lightly damped roll oscillations, sometimes perceived and described as "roll ratcheting." These oscillations may become more prevalent in relatively higher performance-type flight vehicles.

Modern fighter aircraft and high velocity projectiles may experience the damped oscillations at initiation and recovery following relatively large primary roll control commands. Large roll rate commands may require high gradient gains and high roll acceleration to achieve and to recover from a roll in a desired manner. The periodic motions that may follow may be sustained by pilot or vehicle coupled interactions. The effect of these damped oscillations may be reduced using various techniques. FIG. 4 is an example of the use of a roll time constant that may be used to achieve various benefits.

In FIG. 4, the lateral/bank angle control module 108C receives the bank angle guidance command 106B and/or the lateral acceleration guidance command 106C from the guidance module 104. The bank angle guidance command 106B represents a bank angle requested by the guidance module 104. The lateral acceleration guidance command 106C represents a lateral acceleration requested by the guidance module 104.

The bank angle guidance command 106B and/or the lateral acceleration guidance command 106C are input into the lateral/bank angle control module 108C. A bank angle ϕs is subtracted from the bank angle guidance command 106B. The result of the subtraction is received as an input to a roll time constant integrator 630. The roll time constant integrator 630 converts the subtraction result to a roll rate command Pcmd. In one example, the conversion process is performed according to the following equation:

$$p_{cmd} = \frac{\left(\varphi_{cmd} - \frac{p_s}{s}\right)}{\tau_\varphi}$$

where Pcmd is the roll rate command, $\phi_{cmd}$ is the bank angle guidance command 106B, $T_\phi$ is the roll time constant, $P_s$ is a bank angle measurement, and s is an integration value. The value of the roll time constant $T_\phi$ may be adjusted to reduce issues or achieve certain performance gains. The bank angle measurement $P_s$ may be the output of the bank angle measurement device 116B. The integration of the bank angle measurement $P_{s\ at}$ an integrator 632 provides the bank angle ϕs, which is subtracted from the bank angle guidance command 106B as the input to the roll time constant integrator 630.

Once the roll rate command Pcmd is computed, the process may continue in a manner similar to FIG. 3, above. The roll rate command Pcmd and/or the lateral acceleration guidance command 106C are received at the autopilot module 218B. The autopilot module 218B uses the state estimator 114B (as illustrated in FIG. 3) to generate the aileron command 232B and/or the rudder command 232C. The aileron command 232B and/or the rudder command 232C are inputs to the control logic module 220B. The control logic module 220B receives the aileron command 232B and/or the rudder command 232C and outputs the bank angle effector command 110B and/or the lateral effector command 110C to the control effector 112 to implement a maneuver pursuant to the aileron command 232B and/or the rudder command 232C.

Figure 5:
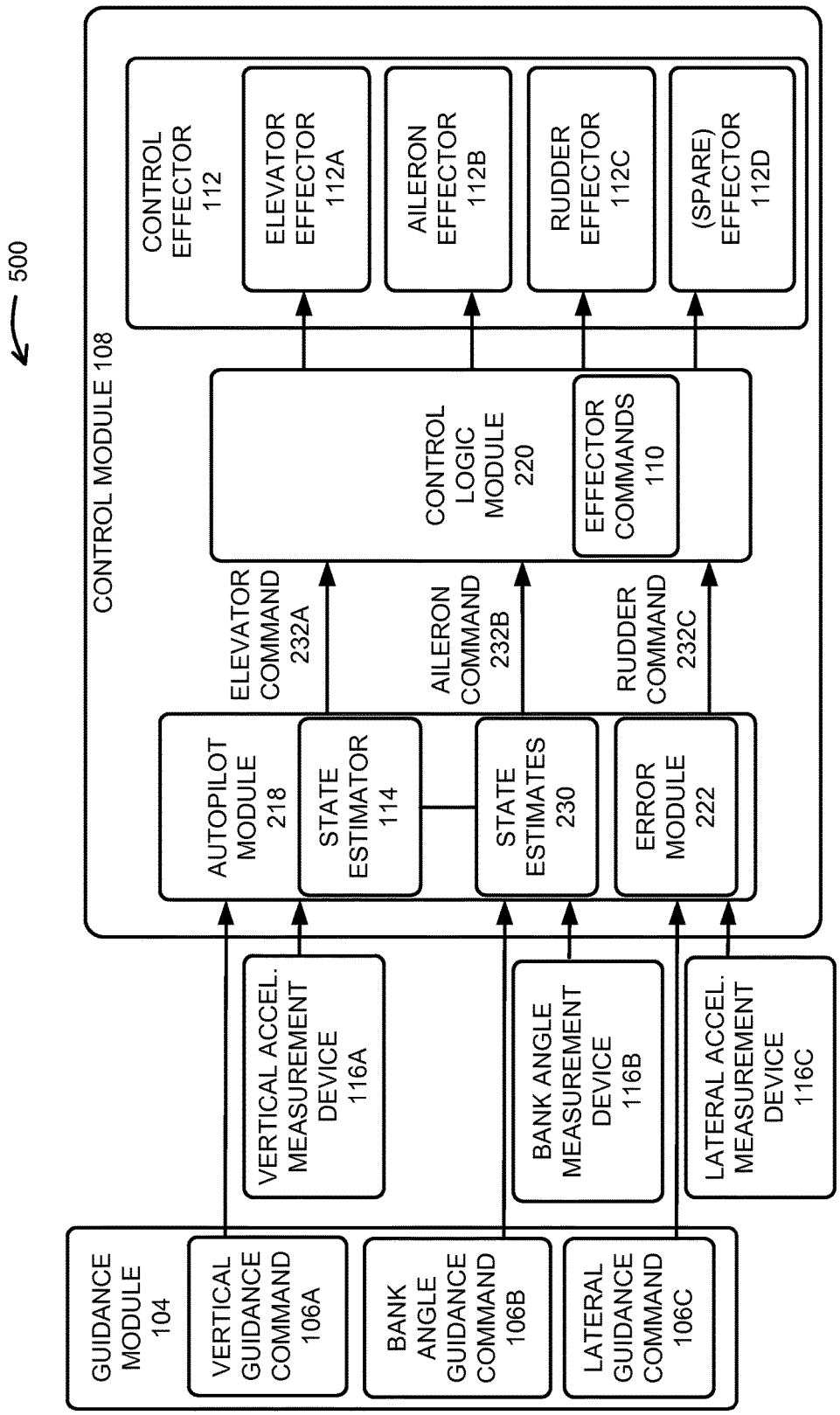
FIG. 5 is an illustration of a guidance and control system according to at least one embodiment disclosed herein.

FIG. 5 is an illustration of a G&C system 500 according to at least one embodiment disclosed herein. The guidance module 104 may output one or more guidance commands. In the configuration illustrated in FIG. 5, the guidance module 104 outputs may include a vertical acceleration guidance command 106A, a bank angle guidance command 106B, and/or a lateral acceleration guidance command 106C. The vertical acceleration guidance command 106A relates to the vertical attitude of the flight vehicle 100. The bank angle guidance command 106B relates to the bank angle of the flight vehicle 100. The lateral acceleration guidance command 106C relates to the lateral attitude of the flight vehicle 100.

It should be understood that the presently disclosed subject matter is not limited to any particular type or combination of guidance commands, as one or more types of guidance commands may be used alone or in combination with other types of guidance commands. Further, the presently disclosed subject matter is not limited to three guidance commands. Some implementations may use fewer than three, while other implementations may use more than three. These and other implementations are considered to be within the scope of the presently disclosed subject matter.

The vertical acceleration guidance command 106A, the lateral acceleration guidance command 106C, and/or the bank angle guidance command 106B are provided to the autopilot module 218. The autopilot module 218 receives the vertical acceleration guidance command 106A, the lateral acceleration guidance command 106C, and/or the bank angle guidance command 106B and determines an elevator command 232A, an aileron command 232B, and a rudder command 232C.

The presently disclosed subject matter is not limited to any particular nomenclature or number of commands, such as the elevator command 232A, the aileron command 232B, or the rudder command 232C. Some implementations may use different control surfaces, while other limitations may use a different number of control surfaces. The autopilot module 218 may interface with various navigational control components. The autopilot module 218 may also be fitted with IR horizon sensors and a second backup GPS for pitch/roll stability augmentation and position determination as a safety backup in the event of failure of any inertial sensor(s). These and other implementations are considered to be within the scope of the presently disclosed subject matter.

The autopilot module 218 includes the state estimator 114 and an error module 222. The state estimator 114 receives an input from the error module 222 and one or more movement measurement devices such as, but not limited to, the vertical acceleration measurement device 116A, the lateral acceleration measurement device 116C, and the bank angle measurement device 116B. The state estimator 114 uses the inputs to calculate the elevator command 232A, the aileron command 232B, and/or the rudder command 232C.

It should be understood that the vertical acceleration measurement device 116A, the lateral acceleration measurement device 116C, or the bank angle measurement device 116B may be used as substitutes for other types of measurement devices, or may be used, in whole or part, as a backup system. The G&C system 500 may be used as a "backup" system to a primary navigation system. For example, if a lateral acceleration device of the primary navigation system faults, the vertical acceleration measurement device 116A, and accompanying modules of the G&C system 500, may be used as a backup to the primary equipment. The G&C system 500 may receive an instruction to provide guidance capabilities to a primary navigation system.

The elevator command 232A, the aileron command 232B, and the rudder command 232C are provided as inputs to the control logic module 220. In some flight vehicles, the elevator command 232A, the aileron command 232B, and the rudder command 232C correspond on a one-to-one basis to physical control surfaces of the flight vehicle 100 (i.e. a physical elevator, a physical aileron, or a physical rudder). In other configurations, the control surfaces are not direct translations of particular control surfaces. For example, two or more control surfaces, operated together, may act as a rudder, aileron, and/or an elevator. In this configuration, the control logic module 220 may receive the elevator command 232A, the aileron command 232B, and/or the rudder command 232C and determine the control surface, or combination of control surfaces, to which the particular command is to be acted upon.

In some configurations, the control surfaces may be termed effectors because the control surfaces provide an expected or desired aerodynamic effect. In FIG. 5, the control effectors 112 include an elevator effector 112A, an aileron effector 112B, and a rudder effector 112C. The elevator effector 112A, the aileron effector 112B, and the rudder effector 112C may each be one or more physical control surfaces that, when acting alone or together, provide the "effect." In some configurations, the control effectors 112 may also include a spare effector 112D.

The control effectors 112 execute the effector commands 110 generated by the control logic module 220. As noted above, the effector commands 110 are commands issued to one or more of the control effectors 112 that implement the elevator command 232A, the aileron command 232B, and/or the rudder command 232C. The control logic module 220 receives the elevator command 232A, the aileron command 232B, and/or the rudder command 232C and calculates the particular effector(s) necessary to implement the elevator command 232A, the aileron command 232B, and/or the rudder command 232C. The control logic module 220 generates one or more effector commands 110 based on the calculation. Separately or collectively, the elevator command 232A, the aileron command 232B, and/or the rudder command 232C may be termed a "control surface command."

Figure 6:
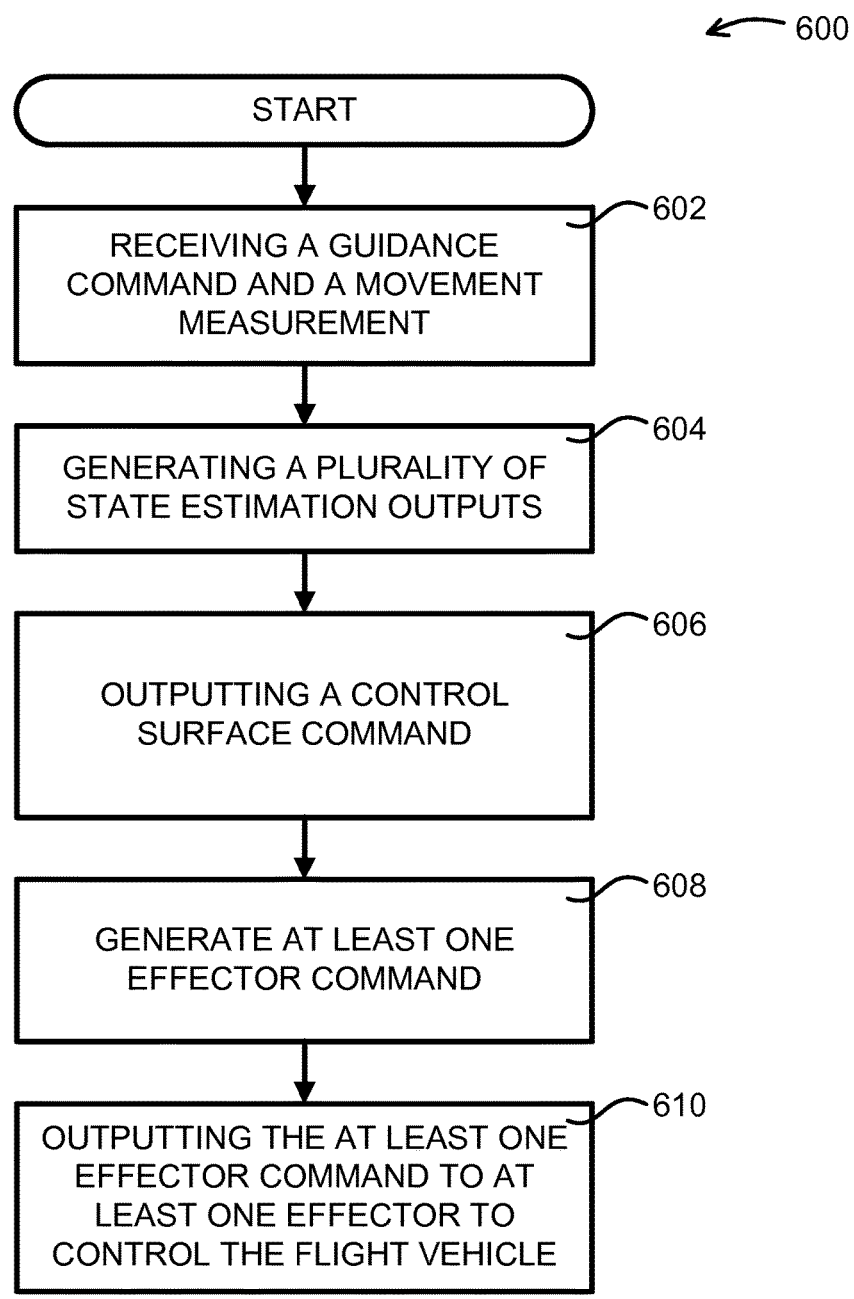
FIG. 6 illustrates one configuration of a routine for controlling a flight vehicle according to at least one embodiment disclosed herein.

FIG. 6 illustrates one configuration of a routine 600 for controlling the flight vehicle 100 using a state estimator according to at least one embodiment disclosed herein. Unless otherwise indicated, more or fewer operations may be performed than shown in the figures and described herein. Additionally, unless otherwise indicated, these operations may also be performed in a different order than those described herein.

The routine 600 commences at operation 602, where a guidance command 106 and a movement measurement is received. The guidance command may be the vertical acceleration guidance command 106A, a lateral acceleration guidance command 106C, or a bank angle guidance command 106B. The guidance commands may be received from the guidance module 104 of the G&C system 500. The guidance commands may be provided to the autopilot module 218.

The movement measurement may be received from one or more movement measurement devices 116. Some examples of movement measurement devices 116 include, but are not limited to, the vertical acceleration measurement device 116A, the bank angle measurement device 116B, or the lateral acceleration measurement device 116V.

The routine 600 continues to operation 604, where a plurality of estimation outputs 230 are generated. In one configuration, the estimation outputs 230 may be generated using a state estimator 114 of the autopilot module 218. In one example, an error between the guidance command and a measured movement may be computed. The computation of the error between the guidance command and the measured movement may include integrating a difference between the guidance command and the measured positional change to generate an integrator output. The integrator output may be provided to a gain module. In one example, the guidance command is modified by subtracting the integrator output from the guidance command.

The guidance command may comprise the vertical acceleration guidance command 106A. In this configuration, the plurality of state estimates may include an estimate of an error, an estimate of an angle of attack, or an estimate of a pitch rate. In another example, the guidance command may comprise a lateral acceleration guidance command 106C or a bank angle guidance command 106B. In this example, the plurality of state estimates may include estimates of a bank tracking error, an integrated lateral acceleration, a yaw rate, an angle of slideslip, a roll rate, and a bank angle. A control surface command may be determined using the plurality of state estimates.

The routine 600 continues to operation 606, where the control surface command 232 is outputted. In one example, the control surface command 232 may be generated as an output of a gain module 224. The gain module 224 may receive the estimation outputs 230 and, using various algorithms, generate the control surface command 232. In one example, the control surface command 232 is computed using a weighted average of the state estimates.

The routine 600 continues to operation 608, where at least one effector command 110 is generated. In one configuration, the control surface command 232 is provided as an input to the control logic module 220. The control logic module 220 generates one or more effector commands 110 to control one or more control effectors 112. As noted above, the control effectors 112 may include one or more physical, control surfaces designed to disturb the flow of air around the flight vehicle 100 to change the trajectory of the flight vehicle.

The routine 600 continues to operation 610, where the effector command 110 is outputted to at least one control effector 112 to control the flight vehicle 100. Two or more effectors, operated together, may act as a rudder, aileron, and/or an elevator. In one configuration, the control logic module 220 may receive the elevator command 232A, the aileron command 232B, and/or the rudder command 232C. The control logic module 220 may determine the effector, or combination of effectors, to which the particular command is to be acted upon. The routine 600 may end or may recommence to provide additional adjustments.

Figure 7:
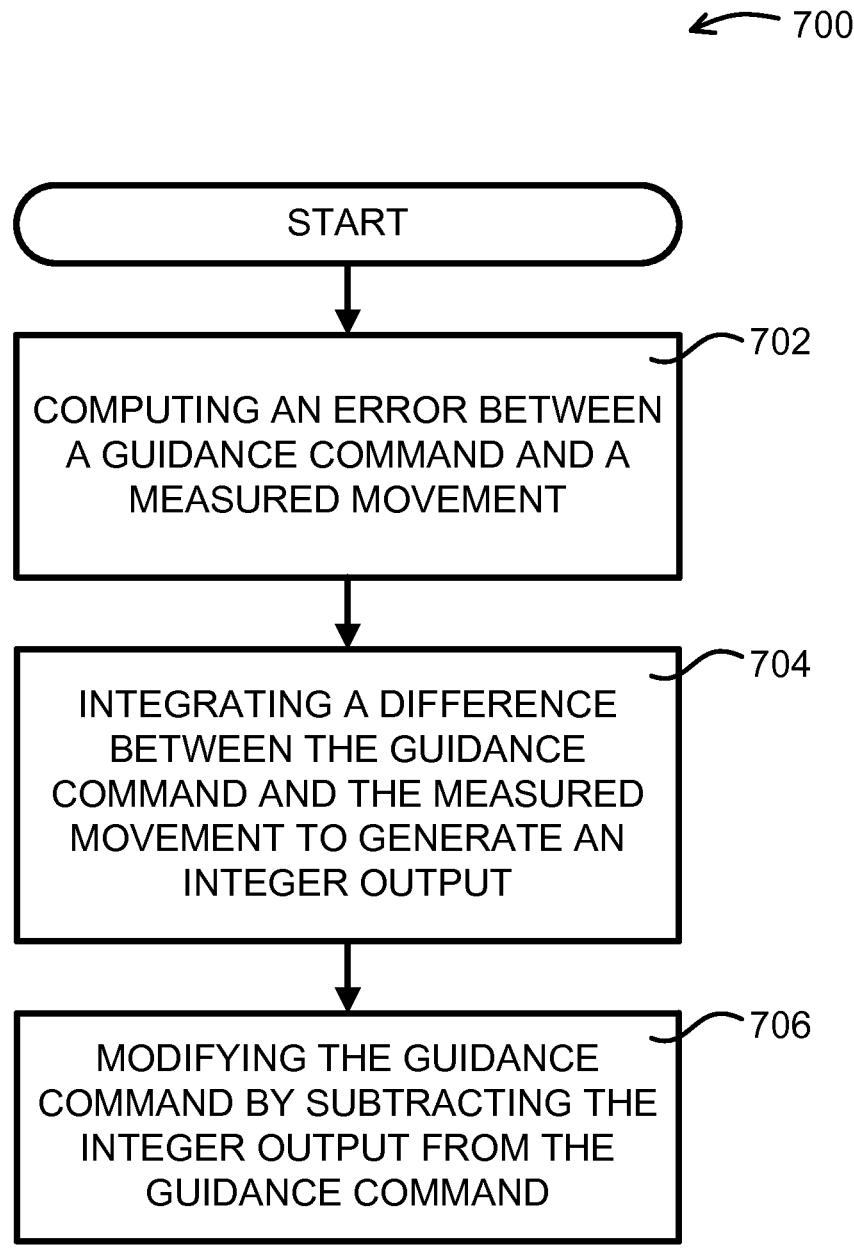
FIG. 7 illustrates one configuration of a routine for modifying a guidance command according to at least one embodiment disclosed herein.

FIG. 7 illustrates one configuration of a routine 700 for modifying a guidance command 106 according to at least one embodiment disclosed herein. The routine 700 commences at operation 702, where an error is computed between the guidance command 106 and a measured.

The routine 700 continues to operation 704, where a difference between the guidance command and the measured movement is integrated to generate an integer output. The integer output is used to modify the guidance command 106 received from the guidance module 104.

The routine 700 continues to operation 706, where the guidance command 106 is modified by subtracting the integer output from the guidance command. The routine 700 may end or may recommence to provide additional modifications to the guidance command.

FIG. 8 illustrates a computer in which a guidance and control system using a state estimator may be implemented according to at least one embodiment disclosed herein. The computer 800 illustrated in FIG. 8 includes one or more central processing unit(s) ("CPUs") 802, a system memory 804, including a random-access memory ("RAM") 806 and a read-only memory ("ROM") 808, and a system bus 810 that couples the system memory 804 to the CPU 802. A basic input/output system containing the routines that help to transfer information between elements within the computer 800, such as during startup, may be stored in the ROM 808.

The CPUs 802 may be standard programmable processors that perform arithmetic and logical operations for the operation of the computer 800, such as the routine 600 described above. The CPUs 802 may perform the operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer 800 may also include a mass storage device 812. The mass storage device may be an optical disk, a magnetic storage device, or a solid state storage device. The mass storage device 812 may be operative to store one or more instructions to control the flight vehicle 100 using an autopilot having a state estimator. In another configuration, the RAM 806, ROM 808, and the mass storage device 812 may be operative to have stored thereon, either alone or in various combinations, instructions for controlling the flight vehicle 100 using an autopilot having a state estimator.

The computer 800 may store programs and data on the mass storage device 812 by transforming the physical state of the mass storage device 812 to reflect the information being stored. The specific transformation of physical state may depend on various factors, in different implementations of this disclosure. Examples of such factors may include, but are not limited to, the technology used to implement the mass storage device 812, whether the mass storage device 812 is characterized as primary or secondary storage, and the like.

For example, the computer 800 may store information to the mass storage device 812 by issuing instructions through a storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer 800 may further read information from the mass storage device 812 by detecting the physical states or characteristics of one or more particular locations within the mass storage device 812.

The RAM 806, the ROM 808, or the mass storage device 812 may be operative as computer-readable storage mediums. Various aspects of the present disclosure may be stored on other types of computer-readable storage mediums, such as, but not limit to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 800. It should be understood that when the claims are interpreted in light of this present disclosure, a computer-readable storage medium does not include energy in the form of waves or signals.

The computer 800 also may include an input/output controller 816 for receiving and processing input from a number of other devices, including a keyboard, mouse, or electronic stylus. Similarly, the input/output controller 816 may provide an output to a display screen, a printer, or other type of output device. One or more embodiments may include a computer-readable storage medium manufactured so that, when read by a properly configured computing device, instructions may be provided to perform operations relating to controlling the flight vehicle using an autopilot having a state estimator.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A computer-implemented method for controlling a flight vehicle, comprising:
   receiving a guidance command;
   receiving a movement measurement;
   generating a plurality of state estimates utilizing the movement measurement when one or more actual state measurements associated with angular accelerations are unavailable, wherein the plurality of state estimates comprises an estimate of an error, an estimate of an angle of attack, and an estimate of a pitch rate;
   utilizing the guidance command and the plurality of state estimates to output a control surface command;
   determining an effector command from the control surface command;
   outputting the effector command to at least one control effector to control the flight vehicle according to the effector command; and
   effectuating the at least one control effector according to the effector command.

2. The computer-implemented method of claim 1, further comprising computing an error between the guidance command and a measured movement.

3. The computer-implemented method of claim 2, wherein computing the error between the guidance command the measured movement comprises integrating a difference between the guidance command and the measured movement to generate an integrator output.

4. The computer-implemented method of claim 3, further comprising modifying the guidance command by subtracting the integrator output from the guidance command.

5. The computer-implemented method of claim 1, wherein the guidance command comprises a vertical acceleration guidance command.

6. The computer-implemented method of claim 1, wherein the guidance command comprises a lateral acceleration guidance command or a bank angle guidance command.

7. The computer-implemented method of claim 1, wherein the plurality of state estimates comprises an estimate of a bank tracking error, an estimate of an integrated lateral acceleration, an estimate of a yaw rate, an estimate of an angle of slideslip, an estimate of a roll rate, or an estimate of a bank angle.

8. The computer-implemented method of claim 1, further comprising inputting the plurality of state estimates into a gain module to generate the control surface command.

9. The computer-implemented method of claim 1, wherein receiving the guidance command comprises receiving a transmission from a transmission source.

10. The computer-implemented method of claim 9, wherein the transmission source comprises a ground station or an aircraft.

11. The computer-implemented method of claim 1, wherein receiving the guidance command comprises receiving pre-programmed instructions on an onboard storage device of the flight vehicle.

12. A guidance and control system for a flight vehicle, comprising:
a guidance system operative to generate a guidance command;
a movement measurement device operative to measure a movement of the flight vehicle to generate a movement measurement;
an autopilot module operative to receive the guidance command, the movement measurement and to:
generate a plurality of state estimates when one or more actual state measurements associated with angular accelerations are unavailable, wherein the plurality of state estimates comprises an estimate of a bank tracking error, an estimate of an integrated lateral acceleration, an estimate of a yaw rate, an estimate of an angle of slideslip, an estimate of a roll rate, and an estimate of a bank angle, and
utilize the guidance command, the movement measurement, and the plurality of state estimates to output a control surface command;
a control logic module operative to receive the control surface command and in response, generate an effector command; and
a control effector operative to receive the effector command to control the flight vehicle according to the effector command.

13. The guidance and control system of claim 12, wherein the autopilot module is further configured to compute an error between the guidance command and a measured movement.

14. The guidance and control system of claim 13, wherein the measured movement is received from a vertical acceleration measurement device, a lateral acceleration measurement device, or a bank angle measurement device.

15. The guidance and control system of claim 13, wherein the autopilot module is further configured to integrate a difference between the guidance command and the measured movement to generate an integrator output.

16. The guidance and control system of claim 15, wherein the autopilot module is further configured to modify the guidance command by subtracting the integrator output from the guidance command.

17. The guidance and control system of claim 12, wherein the guidance command comprises a vertical acceleration guidance command.

18. The guidance and control system of claim 12, wherein the plurality of state estimates comprises an estimate of an error, an estimate of an angle of attack, or an estimate of a pitch rate.

19. The guidance and control system of claim 12, wherein the guidance command comprises a lateral acceleration guidance command or a bank angle guidance command.

20. The guidance and control system of claim 12, wherein the guidance command comprises a transmission received from a transmission source.

21. The guidance and control system of claim 20, wherein the transmission source comprises a ground station or an aircraft.

22. The guidance and control system of claim 12, wherein the guidance command comprises pre-programmed instructions on an onboard storage device of the flight vehicle.

23. The guidance and control system of claim 12, wherein the control effector comprises an elevator effector, an aileron effector, or a rudder effector.

24. The guidance and control system of claim 12, wherein the control logic module is operative to determine a combination of control effectors to which the control surface command is to be implemented.

25. The guidance and control system of claim 12, wherein the flight vehicle comprises a hypervelocity projectile, a mortar, an artillery shell, a skid-to-turn weapon, or a bank-to-turn weapon.

26. A control module for a flight vehicle, comprising:
an autopilot module configured to receive a guidance command from a guidance system and an output of a movement measurement device, the autopilot module operative to increase the gain of the guidance command to a gained guidance command, the autopilot module comprising
an error module operative to receive as inputs the guidance command and the output of the movement measurement device, and further operative to output an error,
a state estimator operative to receive a difference between the gained guidance command and the error and calculate one or more state estimates, wherein the one or more state estimates comprises an estimate of an error, an estimate of an angle of attack, an estimate of a pitch rate, an estimate of a bank tracking error, an estimate of an integrated lateral acceleration, an estimate of a yaw rate, an estimate of an angle of slideslip, an estimate of a roll rate, and an estimate of a bank angle, and
a gain module operative to receive the one or more state estimates to calculate a control surface command; and
a control logic module operative to receive the control surface command and effectuate at least one control effector according to the control surface command to control the flight vehicle.

27. The control module of claim 26, wherein the guidance command comprises a vertical acceleration guidance command, a lateral acceleration guidance command, or a bank angle guidance command.

28. The control module of claim 26, wherein the movement measurement device comprises a vertical acceleration measurement device, a lateral acceleration measurement device, or a bank angle measurement device.

* * * * *